United States Patent
Badalamenti et al.

(10) Patent No.: US 10,508,925 B2
(45) Date of Patent: Dec. 17, 2019

(54) PICKUP LOCATION SELECTION AND AUGMENTED REALITY NAVIGATION

(71) Applicant: Uber Technologies, Inc., San Francisco, CA (US)

(72) Inventors: John Badalamenti, San Francisco, CA (US); Joshua Inch, Seattle, WA (US); Christopher Michael Sanchez, San Francisco, CA (US); Theodore Russell Sumers, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 113 days.

(21) Appl. No.: 15/693,317

(22) Filed: Aug. 31, 2017

(65) Prior Publication Data
US 2019/0063935 A1 Feb. 28, 2019

(51) Int. Cl.
*G01C 21/34* (2006.01)
*G01C 21/36* (2006.01)
(Continued)

(52) U.S. Cl.
CPC ..... *G01C 21/3438* (2013.01); *G01C 21/3617* (2013.01); *G01C 21/3647* (2013.01); *G06Q 50/30* (2013.01); *G06T 11/60* (2013.01)

(58) Field of Classification Search
CPC ............ G01C 21/3438; G01C 21/3617; G01C 21/3647; G06Q 50/30; G06T 11/60
See application file for complete search history.

(56) References Cited

U.S. PATENT DOCUMENTS 9,613,386 B1    4/2017 Arden et al.
10,126,138 B1 * 11/2018 Farmer .............. G01C 21/3438
(Continued)

FOREIGN PATENT DOCUMENTS

KR    10-2013-0112191 A    10/2013
KR    10-2015-0061101 A    6/2015
WO    WO 2014-201324 A1    12/2014

OTHER PUBLICATIONS

PCT International Search Report and Written Opinion, PCT Application No. PCT/IB2018/056377, dated Dec. 13, 2018, 11 pages.
(Continued)

*Primary Examiner* — Rodney A Butler
(74) *Attorney, Agent, or Firm* — Fenwick & West LLP

(57) ABSTRACT

A network system, such as a transport management system, selects a pickup location for a trip and navigates a rider to the selected pickup location using augmented reality (AR). Responsive to receiving a trip request including an origin location, a pickup location selection module selects candidate pickup locations within a threshold distance of the rider client device. The pickup location selection module filters and ranks the candidates based on historical service data and location characteristics associated with the origin location as well as any history of pickups of the rider at the origin location and data from the trip request. The top-ranked candidate is selected as the pickup location and sent to the rider and driver client devices. An AR navigation module instructs the rider client device to visually augment a live video stream with computer-generated AR elements to navigate the rider from a current location to the pickup location.

16 Claims, 4 Drawing Sheets

(51) Int. Cl.
*G06Q 50/30* (2012.01)
*G06T 11/60* (2006.01)

(56) References Cited

U.S. PATENT DOCUMENTS

| | | | |
|---|---|---|---|
| 2002/0075282 A1* | 6/2002 | Vetterli | G01C 21/20 345/632 |
| 2010/0250116 A1* | 9/2010 | Yamaguchi | G01C 21/3644 701/533 |
| 2011/0153198 A1* | 6/2011 | Kokkas | G01C 21/3638 701/533 |
| 2013/0132140 A1* | 5/2013 | Amin | G06Q 10/02 705/7.13 |
| 2014/0067488 A1 | 3/2014 | James et al. | |
| 2015/0332425 A1 | 11/2015 | Kalanick et al. | |
| 2016/0370194 A1 | 12/2016 | Colijn et al. | |
| 2017/0220966 A1 | 8/2017 | Wang | |
| 2018/0075287 A1 | 3/2018 | Elswick | |
| 2018/0174265 A1* | 6/2018 | Liu | G06Q 10/04 |
| 2018/0189566 A1 | 7/2018 | Grimm et al. | |
| 2019/0017839 A1 | 1/2019 | Eyler et al. | |

OTHER PUBLICATIONS

United States Office Action, U.S. Appl. No. 16/197,243, dated Jul. 11, 2019, 12 pages.
PCT International Search Report and Written Opinion, PCT Application No. PCT/IB2019/050612, dated Aug. 19, 2019, 11 pages.

\* cited by examiner

PICKUP LOCATION SELECTION AND AUGMENTED REALITY NAVIGATION

BACKGROUND

The described embodiments generally relate to the field of network systems, and, more particularly, to determining a pickup location based on historical service data and navigating a rider to the determined location using augmented reality.

Network systems, such as transport management systems, provide support for logistical issues in managing the transportation of people, cargo, or the like. In some systems, a driver provides transportation services to a rider to a location selected by the rider. Typically, the pickup location for a trip is the rider's current location as input by the rider or determined by a location determination module on the rider client device. This may lead to inefficiencies in the pickup process in densely populated pickup areas and in instances when characteristics of the pickup location (e.g., bus stops or hedges lining the road) render the location unsuitable for pickup. Riders and drivers must then coordinate a new pickup location, causing frustration to the parties and further delaying the trip.

SUMMARY

To enable a more efficient pickup of a rider, a network system uses historical service data and location characteristics to select an efficient pickup location and navigate the rider to the location using augmented reality (AR).

A trip management module receives, through the rider application, rider input comprising a set of service data. In one embodiment, the service data includes at least an origin location, a request for a driver associated with the network system to transport the rider from the origin location, and, optionally, a destination location and a desired departure time. The origin location is a physical location over a threshold radius and/or with predetermined boundaries (e.g., San Francisco International Airport) and encompasses one or more pickup locations (e.g., a two meter-long stretch of curb where the driver stops and the rider enters the vehicle).

Responsive to receiving the request for service, the trip management module sends an instruction to a pickup location selection module to select one or more pickup locations within a threshold distance of the rider's current location. The pickup location selection module then queries a pickup location data store for historical service data and location characteristics associated with the origin location. Historical service data includes data regarding past trips beginning at the origin location, including pickup locations ("candidate pickup locations"), destination locations, and/or feedback from riders and/or drivers. Location characteristics for an origin location include traffic and/or other road and sidewalk conditions that might make a candidate pickup location suitable or not suitable for use as a pickup location. For example, relevant road and sidewalk conditions might include bus stops, taxi stands, lane closures, fire hydrants, and fences between the sidewalk and the road.

The pickup location selection module filters the candidate pickup locations to include only pickup locations within a threshold distance of the rider's current location and ranks the candidate pickup locations based on the retrieved data, as well as data from the trip request and historical service data for the rider. The top-ranked candidate pickup location (s) are then sent to the rider client device. In embodiments where the pickup location selection module sends multiple candidate pickup locations to the rider, the pickup location selected by the rider is used as the pickup location.

The pickup location selection module notifies an AR navigation module of the selected pickup location, which generates navigation instructions from the rider's current location to the pickup location as well as computer-generated AR elements (e.g., graphics, text, images) based on the geographic location, camera position, and tilt of the rider client device. The AR navigation module then sends an instruction to the rider client device to begin a live video feed, e.g., through activation of the camera on the rider client device and instructs an AR application on the rider client device to overlay the generated AR elements onto the display. As the rider progresses along the route to the pickup location (i.e., as the geographic location and camera position of the rider client device change), the AR navigation module updates the navigation instructions and AR elements until the rider reaches the selected pickup location.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
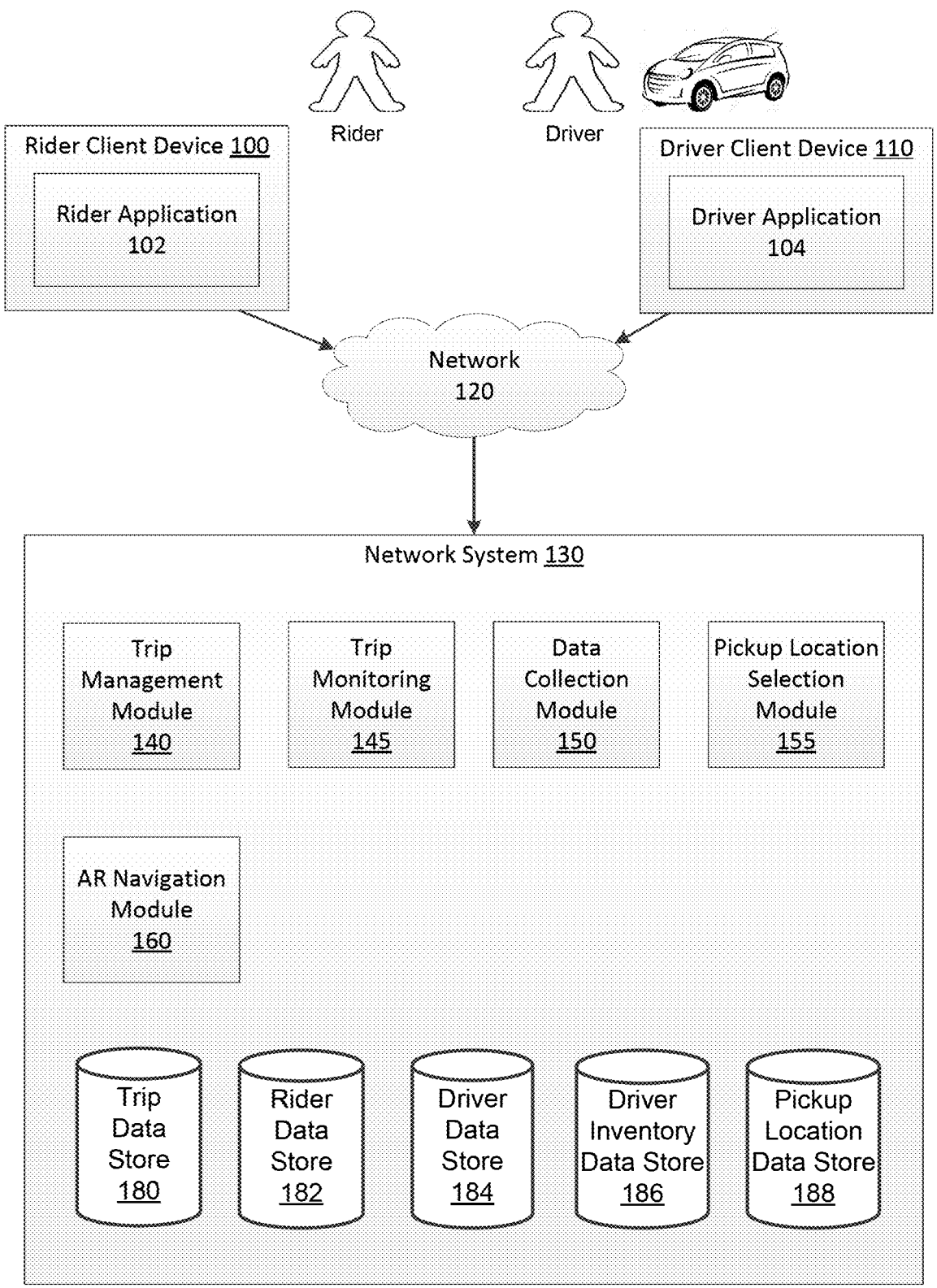
FIG. 1 illustrates the system environment for an example network system, in accordance with an embodiment.

Turning now to the specifics of the system architecture, FIG. 1 illustrates a system environment for an example network system 130. In the example of FIG. 1, the network system 130 coordinates the transportation of persons and/or goods/items for a user (e.g., such as a rider) by a service provider (e.g., a driver of a vehicle). The driver uses a vehicle to provide the transportation to the rider. In this example embodiment, the network system 130 includes a trip management module 140, a trip monitoring module 145, a data collection module 150, a pickup location selection module 155, an AR navigation module 160, and various data stores including a trip data store 180, a rider data store 182, a driver data store 184, a driver inventory data store 186, and a pickup location data store 188. These modules and data stores are not native components of a generic computer system, and provide structures and functions beyond generic functions of a computer system, as further described below.

A rider operates a client device 100 that executes a rider application 102 that communicates with the network system 130. The rider operates the rider application 102 to view information about the network service 130, and to make a request for service from the network system 130 for a delivery or transport service ("a trip") of the rider (and, optionally, additional persons) and/or items, for example cargo needing transport. The rider application enables the rider to specify an origin location and/or a destination location associated with the trip. An origin location and/or destination location may be a location inputted by the rider or may correspond to the current location of the rider client device 100 as determined automatically by a location determination module (not shown) in the rider client device 100, e.g., a global positioning system (GPS) component, a wireless networking system, or a combination thereof. For purposes of simplicity, as described herein, an origin location can include a pickup location for service (i) determined by the rider application 102 (e.g., based on the current location of the rider client device 100 using a GPS component, (ii) specified or selected by the rider, or (iii) determined by the network system 130. In one embodiment, the network system 130 recommends one or more pickup locations to a rider based on historical service data and location characteristics associated with the origin location, as discussed below.

According to examples herein, the rider client device 100 can transmit a set of data (e.g., referred to herein as "service data") to the network system 130 over the network(s) 120 in response to rider input or operation of the rider application 102. Such service data can be indicative of the rider's interest in potentially requesting service (e.g., before actually confirming or requesting the service). For example, the rider may launch the rider application 102 and specify an origin location and/or a destination location to view information about the network service before making a decision on whether to request service. The rider may want to view information about the average or estimated time of arrival for pick up by a driver, the estimated time to the destination, the price, the available service types, etc. Depending on implementation, the service data can include the origin and/or destination location information, rider information (e.g., identifier), application information (e.g., version number), device identifier or type, etc. According to some examples, each time the rider modifies the origin and/or destination location, the rider application 102 can generate and transmit the service data to the network system 130.

Once the rider confirms or orders a service via the rider application 102, the rider application 102 can generate data corresponding to a request for the service through the network system 130 (e.g., also referred to herein as a "trip request"). Responsive to receiving a trip request, the network system 130 uses information from the trip request to match the rider with one of a plurality of available drivers. Depending on implementation, the trip request can include rider or device information (e.g., a rider identifier, a device identifier), a service type (e.g., vehicle type) and/or an origin location, a destination location, a payment profile identifier, and/or other data. The network system 130 selects a driver from a set of drivers, such as based on the driver's current location and status (e.g., offline, online, available, etc.) and/or information from the trip request (e.g., service type, origin location, and/or destination location), to provide the service for the rider and transport the rider from the origin location to the destination location. Responsive to selecting an available driver, the network system 130 sends an invitation message to the driver client device 110 inviting the driver to fulfill the trip request.

The driver operates a client device 110 executing a driver application 104 that communicates with the network system 130 to provide information indicating whether the driver is available or unavailable to provide transportation services to riders. The driver application 104 can also present information about the network system 130 to the driver, such as invitations to provide service, navigation instructions, map data, etc. In one embodiment, the driver application 104 enables the driver to provide information regarding availability of the driver by logging into the network system 130 and activating a setting indicating that they are currently available to provide service. The driver application 104 also provides the current location of the driver or the driver client device 110 to the network system 130. Depending on implementation, the current location may be a location inputted by the driver or may correspond to the current location of the driver client device 110 as determined automatically by a location determination module (not shown) in the driver client device 110 (e.g., a GPS component, a wireless networking system, or a combination thereof. The driver application 104 further allows a driver to receive, from the trip management module 140, an invitation message to provide a service for a requesting rider, and if the driver accepts via input, the driver application 104 can transmit an acceptance message to the trip management module 140. The trip management module 140 can subsequently provide information about the driver to the rider application 102. As another embodiment, the driver application 104 can enable the driver to view a list of current trip requests and to select a particular trip request to fulfill. The driver application 104 can also receive routing information from the trip management module 140. The driver application 104 enables a driver to provide a rating for a rider upon completion of a trip. In one embodiment, the rating is provided on a scale of one to five, five being the maximal (best) rating.

The rider client device 100 and the driver client device 110 are portable electronic devices such as smartphones, tablet devices, wearable computing devices (e.g., smartwatches) or similar devices. Alternatively, the driver client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The rider client device 100 and the driver client device 110 can visually augment captured video streams and/or images using AR. AR augments views of a physical, real-world environment with computer-generated elements (e.g., images, video, text, graphics, etc.). The client devices 100 and 110 use an inertial measuring unit (IMU) to measure the velocity, orientation, and gravitational forces on the client devices 100 and 110. In one embodiment, AR functionality is executed via an AR application on the client devices 100 and 110. The AR application can be a standalone application on the client devices 100 and 110 or a plug-in to the rider application 102 and driver application 104. In other embodiments, a head-mounted display (HMD) is connected to the client devices 100 and 110 via a wireless communication protocol such as Bluetooth and is used to display the AR video stream and/or images.

The rider client device 100 and the driver client device 110 interact with the network system 130 through client applications configured to interact with the network system 130. The applications 102 and 104 of the rider client device 100 and the driver client device 110, respectively, can present information received from the network system 130 on a rider interface, such as a map of the geographic region, and the current location of the rider client device 100 or the driver client device 110. The applications 102 and 104 running on the rider client device 100 and the driver client device 110 can determine the current location of the device and provide the current location to the network system 130.

The trip management module 140 is configured as a communicative interface between the rider application 102, the driver application 104, and the various modules and data stores in the network system 130, and is one means for performing this function. The trip management module 140 is configured to receive driver availability status information and current location information from the driver application 104 and update the driver inventory data store 186 with the availability status. The trip management module 140 is also configured to receive trip requests from the rider application 102 and creates corresponding trip records in the trip data store 180. According to an example, a trip record corresponding to a trip request can include or be associated with a trip ID, a rider ID, an origin location, a destination location, a service type, pricing information, and/or a status indicating that the corresponding trip request has not been processed. According to one example, when a driver accepts the invitation message to service the trip request for the rider, the trip record can be updated with the driver's information as well as the driver's location and the time when the trip request was accepted. Similarly, location and time information about the service as well as the cost for the service can be associated with the trip record.

In one embodiment, during the trip, the trip monitoring module 145 receives information (e.g., periodically) from the driver application 104 indicating the location of the driver's vehicle and/or telematics information (e.g., indications of current speed, acceleration/deceleration, events, stops, and so forth). The trip monitoring module 145 stores the information in the trip data store 180 and can associate the information with the trip record. In some embodiments, the trip monitoring module 145 periodically calculates the driver's estimated time of arrival (DETA) at the pickup location and provides the DETA to the rider application 102.

The data collection module 150 collects and aggregates historical service data and location characteristics associated with origin locations for use in pickup location selection. In one embodiment, historical service data is extracted from trip records stored in the trip data store 180. Additionally or alternatively, the data collection module 150 solicits feedback from riders and drivers after a trip, including whether the pickup location was a suitable pickup location. For example, a rider might specify that the pickup location was not suitable because it was in front of a bus stop or a taxi stand.

The historical service data collected by the data collection module 150 includes data regarding past trips beginning at the origin location, including pickup locations (and the frequency with which particular sets of coordinates have been used as pickup locations), destination locations, and feedback from riders and/or drivers. Additionally or alternatively, historical service data includes rider ratings for drivers, and/or driver ratings for riders. For example, in some circumstances, a low rating for a driver might suggest a problem during the pickup process, e.g., the rider was unable to find and/or reach the driver's vehicle, potentially due in part to the specific pickup location for that trip. Further, in some embodiments, historical service data for an origin location includes inferred characteristics of the origin location based on aggregations of sensor traces and interactions from riders and drivers during pickups at pickup locations associated with the origin location, such as the frequency with which riders and drivers call each other at the pickup location, the frequency with which the pickup of the rider occurs at a location more than a threshold distance away from the pickup location, and/or the frequency with which a driver arrives at the pickup location before the rider's arrival.

The location characteristics collected by the data collection module 150 include traffic and/or other road and sidewalk conditions and restrictions at the origin location. For example, road conditions and restrictions at the origin location might include one-way streets, bus lanes, bike lanes, fire lanes, bus stops, taxi stands, construction, and road and/or lane closures, etc. Sidewalk conditions might include fire hydrants or barriers between the sidewalk and the road (e.g., fences, hedges, etc.).

The data collection module 150 aggregates the historical service data and location characteristics for an origin location and sends the aggregated data to the pickup location data store 188. In one embodiment, the data collection module 150 periodically queries the trip data store 180 for additional trip records and updates the aggregated data for the origin location.

The pickup location selection module 155 recommends one or more pickup locations to a rider based on historical service data and location characteristics associated with an origin location. Responsive to receiving a trip request including an origin location, the trip management module sends an instruction to the pickup location selection module 155 to select one or more pickup locations within a threshold distance of the rider client device 100, as determined by the location determination module in the rider client device 100.

The pickup location selection module 155 queries the pickup location data store 188 for the aggregated data collected by the data collection module 150 for the origin location and filters the received data to include pickup locations within a threshold distance of the rider client device 100. In one embodiment, the pickup location selection module 155 allows the rider to specify the threshold distance through the rider application 102. For example, the rider might wish to be picked up close to her current location and might set the threshold at a short distance (e.g., 40 meters). Alternatively, the rider might wish to be picked up farther away from her current location (e.g., to avoid being picked up on a busy street) and might set the threshold at a longer distance (e.g., four hundred meters).

The pickup location selection module 155 uses machine learning techniques to train a model configured to predict a likelihood that a candidate pickup location is suitable for pickup of the rider. The model determines a ranking score based on historical service data and location characteristics associated with an origin location. For example, a candidate pickup location might receive a high ranking score if historical service data indicates that it has frequently been used as a pickup location and has received positive feedback from riders and/or drivers, whereas a candidate pickup location might receive a low ranking score if location characteristics indicate that it is adjacent to a bus stop, in a fire lane, or in front of a row of hedges. In another example, a candidate pickup location might receive a low ranking score if inferred characteristics show that riders tend to call drivers at a higher rate at the candidate pickup location relative to nearby pickup locations and/or past pickups intended to occur at the candidate pickup location have occurred at locations more than a threshold distance away from the candidate pickup location.

In one embodiment, the ranking score is also determined based on any history of pickups of the rider at the candidate pickup locations. For example, while a candidate pickup location that has frequently been used as a pickup location for other riders might typically receive a high ranking score, it might receive a lower ranking score if the rider has provided negative feedback about the location's suitability as a pickup location. Conversely, if a rider has frequently been picked up at a candidate pickup location (e.g., the pickup location is directly outside the rider's office), the pickup location might receive a high ranking score.

In various embodiments, the model uses data from the trip request when generating the ranking score. For example, if the rider's destination location is south of his current location, a candidate pickup location on the northbound side of the street might be ranked lower than a candidate pickup location on the southbound side of the street.

The pickup location selection module 155 then ranks the candidate pickup locations based on the ranking scores and selects the top ranked candidate as the pickup location for the trip. In one embodiment, the pickup location selection module 155 sends the selected pickup location to the rider client device 100 and the driver client device 110. In another embodiment, the pickup location selection module 155 sends multiple candidate pickup locations to the rider client device 100 and allows the rider to select the pickup location from among the presented candidates. The selected pickup location is then sent to the driver through the driver client device 110 and reported to the trip management module 140, which updates the trip record in the trip data store 180.

Responsive to selecting or receiving a selection of a pickup location, the pickup location selection module 155 sends the selected pickup location to the AR navigation module 160, which uses AR to navigate the rider to the pickup location. In one embodiment, the AR navigation module 160 queries the rider through the rider application 102 to allow the rider to opt-in to navigation instructions. In another embodiment, the AR navigation module 160 automatically begins navigation responsive to the pickup location selection module 155 notifying the rider of the selection.

The AR navigation module 160 generates navigation instructions from the rider's current location to the selected pickup location as well as computer-generated AR elements (e.g., images, video, text, graphics, etc.) to display on the rider client device 100 based on the geographic location, camera direction, and tilt of the rider client device 100, as determined by the IMU. For example, the camera direction and tilt can be used to determine whether the direction and angle at which the camera is pointing would capture an image that should be included in the navigation instructions and thus augmented by associated AR elements.

The AR navigation module 160 instructs the rider client device 100 to initiate a live video feed using the camera on the rider client device 100 and to begin displaying the captured feed on the display. Responsive to the rider client device 100 initiating the live video feed, the AR navigation module 160 instructs the AR application to overlay AR elements onto the display. The AR elements include graphics (e.g., arrows, lines, etc.) and, optionally, text that direct the rider to the pickup location. For example, the AR navigation module 160 might instruct the AR application to display an arrow pointing to the right and text reading "20 meters" to indicate to the rider that she should turn right in 20 meters. In some embodiments, the AR elements include audio navigation instructions.

In some embodiments, the display can include AR elements that help navigate a rider who has taken a wrong turn back to the calculated route. For example, if a rider turns left but the calculated route requires the rider to have turned right, the AR navigation module 160 might instruct the AR application to display AR elements (e.g., text) instructing the rider to turn around. Alternatively, the AR navigation module 160 might instruct the AR application not to display any AR elements as a visual indication to the rider that the current direction is not on the route.

As the rider progresses along the route to the pickup location, the AR navigation module 160 updates the navigation instructions and associated computer-generated elements based on the rider's current position until the rider reaches the pickup location. In some embodiments, the pickup location is designated by an AR location marker (e.g., a pin or a highlighted strip of sidewalk) and/or text elements indicating to the rider that he has reached the pickup location.

The pickup location selection module 155 continues to monitor the historical service data and location characteristics of pickup locations within a threshold distance of the rider client device 100 as the rider travels from her current location to the selected pickup location. In some embodiments, if the ranking score for an alternate pickup location is higher than the ranking score for the selected pickup location (e.g., if traffic conditions change or if a second driver is closer to the origin location but approaching from a different direction than the first driver), the pickup location selection module 155 notifies the AR navigation module 160, which generates AR elements to inform the rider of the alternate pickup location. For example, the AR navigation module 160 might instruct the AR application on the rider client device 100 to highlight a curb and display text reading "Two minutes faster to get picked up here" or "Save your driver three minutes and get picked up here.").

The trip data store 180 maintains a record of each in-progress and completed trip coordinated by the network system 130. More specifically, each trip provided by a driver to a rider is characterized by a set of attributes (or variables), which together form a trip record that is stored in the trip data store 180. The attributes describe aspects of the driver, the rider, and the trip. In one embodiment, each trip record includes a trip identifier (ID), a rider ID, a driver ID, the origin location, the pickup location, the pickup spot, the destination location, the duration of the trip, the service type for the trip, estimated time of pick up, actual time of pickup, and driver rating by rider, rider rating by driver, price information, market information, and/or other environmental variables as described below. In some embodiments, the trip record also includes rider and/or driver feedback regarding the pickup spot. The variables for the trip record are thus drawn from multiple sources, including the rider's master and usage records in the rider data store 182, the driver's master and operational records in the driver data store 184, and specific variables captured and received during each trip.

The driver data store 184 stores account and operational information for each driver who participates in the network system 130. For each driver, the driver data store 184 stores one or more database records associated with the driver, including both master data and usage data. In some examples, master data for a driver includes the driver's name, driver's license information, insurance information, vehicle information (year, make, model, vehicle ID, license plate), address information, cell phone number, payment information (e.g., credit card number), sign-up date, driver service type (regular, luxury, van, etc.), device type (e.g., type of cell phone), platform type (e.g., iOS, Android), application ID, and/or application version for the driver application 104).

The driver inventory data store 186 stores driver availability status information received from the trip management module 140, including whether the driver is available for matching and the location of the driver (which gets updated periodically). When the trip management module 140 receives a trip request, the trip management module 140 determines, from the driver inventory data store 186, which drivers are potential candidates to pick up the rider for the newly created trip. When the network system 130 marks a trip record as complete, the network system 130 can add the driver back into the inventory of available drivers in the driver inventory data store 186).

Figure 2:
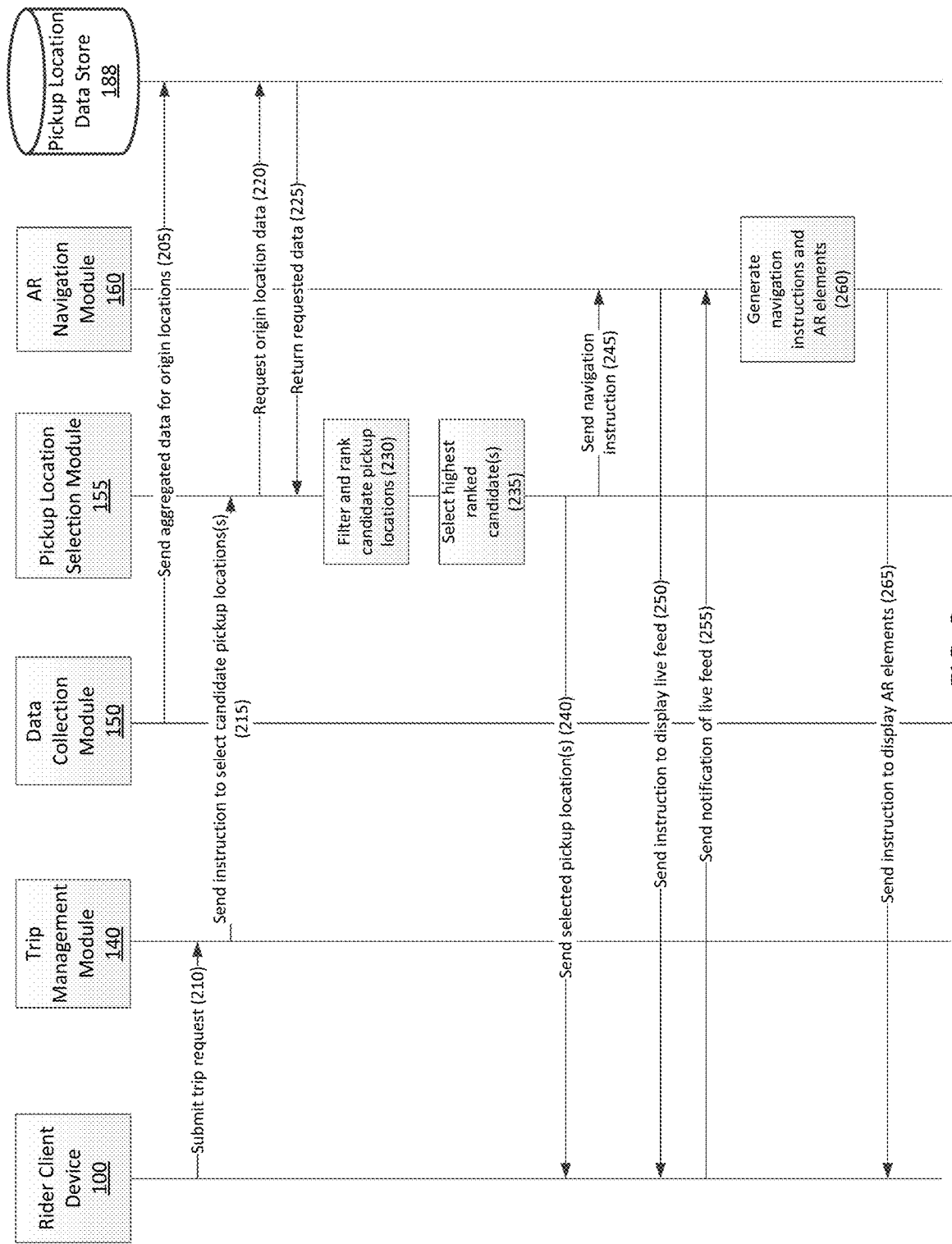
FIG. 2 is an interaction diagram for selecting and providing AR navigation instructions for a pickup location, in accordance with an embodiment.

FIG. 2 is an interaction diagram for selecting and providing AR navigation instructions for a pickup location, in accordance with an embodiment. The data collection module 150 aggregates data associated with origin locations for use in pickup location selection. In one embodiment, historical service data and location characteristics are extracted from trip records associated with past trips beginning at the origin location. Additionally or alternatively, the data collection module 150 solicits feedback from riders and drivers after a trip and aggregates received feedback with the extracted data for each origin location. At 205, the data collection module 150 sends the aggregated data for the origin locations to the pickup location data store 188.

A rider submits 210 a trip request through the rider application 102 for a trip from an origin location to a destination location. The origin location may be a location inputted by the rider or may correspond to the current location of the rider client device 100. The trip management module 140 receives the trip request and sends 215 an instruction to the pickup location selection module 155 to select one or more pickup locations within a threshold distance of the rider client device 100. In one embodiment, the rider specifies the threshold distance (i.e., how far the rider is willing to travel before being picked up by the driver).

Responsive to receiving the instruction, the pickup location selection module 155 queries 220 the pickup location data store 188 for the historical service data and location characteristics associated with the origin location. In one embodiment, the historical service data includes candidate pickup locations (i.e., previously used pickup locations at the origin location). The pickup location data store 188 returns 225 the requested data, which the pickup location selection module 155 uses to filter and rank 230 the candidate pickup locations. Candidates are filtered to include only those pickup locations within the threshold distance of the rider client device 100 and are ranked based in part on the historical service data and location characteristics. For example, a candidate pickup location might receive a low ranking if it is adjacent to a bus lane or has received negative feedback from other riders and/or drivers regarding its suitability as a pickup location. In some embodiments, history of pickups of the rider at the origin location and/or data from the trip request are also used to determine the rankings.

At 235, the pickup location selection module 155 selects one or more of the highest ranked candidates as the pickup location for the trip. In one embodiment, the pickup location selection module 155 automatically selects the top ranked candidate pickup location and sends 240 the selected pickup location to the rider client device 100, the driver client device 110, and the trip management module 140. Alternatively, the pickup location selection module 155 sends multiple candidate pickup locations (e.g., the two or three highest ranked candidates) to the rider client device 100 and allows the rider to select the pickup location.

The pickup location selection module 155 notifies the AR navigation module 160 of the selected pickup location and sends 245 an instruction to begin navigation. In one embodiment, the AR navigation module 160 queries the rider through the rider application 102 to allow the rider to opt-in to receiving navigation instructions. In other embodiments, the AR navigation module 160 automatically begins navigation responsive to the pickup location selection module 155 notifying the AR navigation module 160 of the selected pickup location.

At 250, the AR navigation module 160 sends an instruction to the rider client device 100 to begin displaying a live video feed for use in AR navigation. Responsive to the rider client device 100 notifying 255 the AR navigation module 160 that the live feed has begun, the AR navigation module 160 generates 260 navigation instructions from the rider's current location to the selected pickup location as well as computer-generated AR elements to overlay on the live video feed. The AR navigation module 160 determines which AR elements (e.g., graphics, text, icons, etc.) to display based on the geographic location, camera direction, and tilt of the rider client device 100, and updates the applicable AR elements as the rider progresses along the route to the selected pickup location.

The AR navigation module 160 sends an instruction 265 to the AR application on the rider client device 100 to overlay the generated AR elements onto the display. The AR elements include graphics (e.g., arrows, lines, etc.) that direct the rider to the pickup location. In some embodiments, the AR elements also include text or audio navigation instructions. For example, an instruction for the rider to turn left in 20 feet might be represented as an arrow pointing left with accompanying text reading "20 feet" or as an audio instruction to "Turn left in 20 feet."

As the rider progresses along the route (i.e., as the geographic location and camera position of the rider client device 100 change), the AR navigation module 160 updates the navigation instructions and instructs the AR application to display associated AR elements until the rider reaches the selected pickup location. In some embodiments, the AR navigation module 160 notifies the rider that she has reached the pickup location by sending for display an AR location marker (e.g., a pin or highlighted strip of sidewalk) and/or text elements (e.g. "You have reached the pickup location.").

Figure 3:
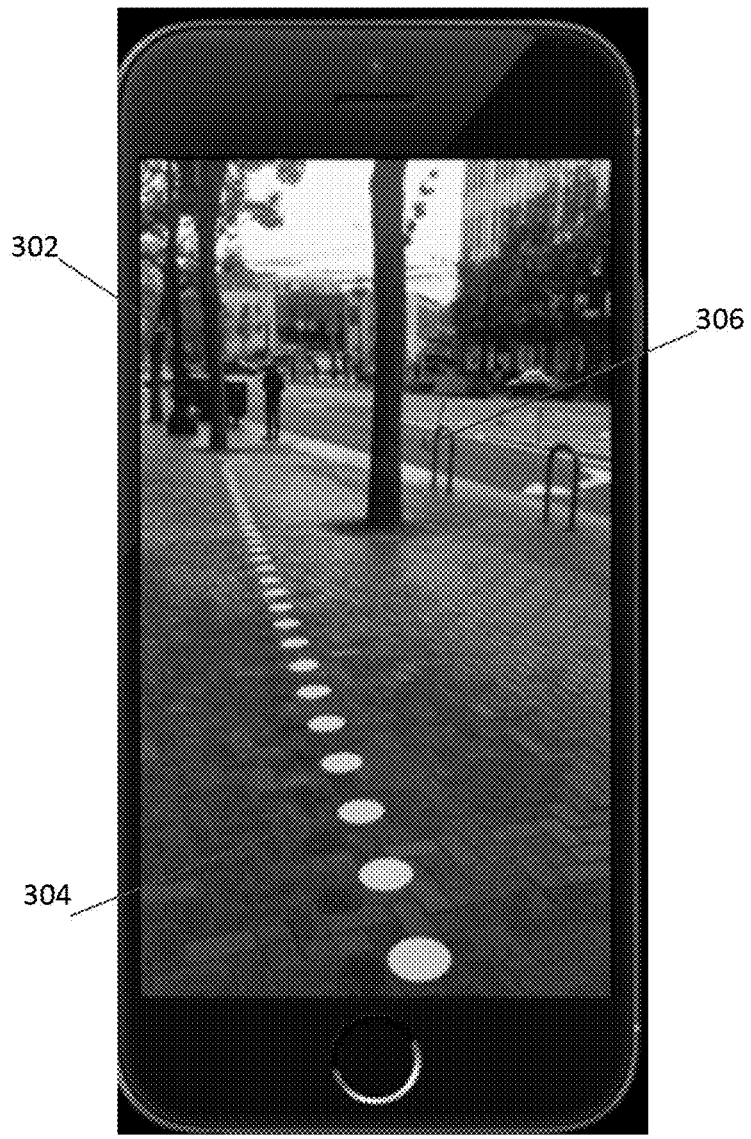
FIG. 3 illustrates an example captured image augmented with a route to a pickup location, in accordance with an embodiment.

FIG. 3 illustrates an example captured image 302 displayed in a user interface of a rider client device 100. The captured image is augmented with a route 304 to a pickup location 306, in accordance with an embodiment. Using the geographic position, camera direction, and tilt of the rider client device 100, the AR navigation module 160 selects computer-generated AR elements to display on the rider client device 100 to navigate the rider to the pickup location 306. In the captured image 302, the rider client device 100 displays an image of a sidewalk and a road overlaid by graphical elements intended to navigate the rider to the pickup location indicated by a highlighted strip of sidewalk. While the AR elements in FIG. 3 include only graphical elements, in some embodiments, the AR elements include text and/or audio navigation instructions (e.g., "The pickup location is 5 meters ahead of you on the right.").

Figure 4:
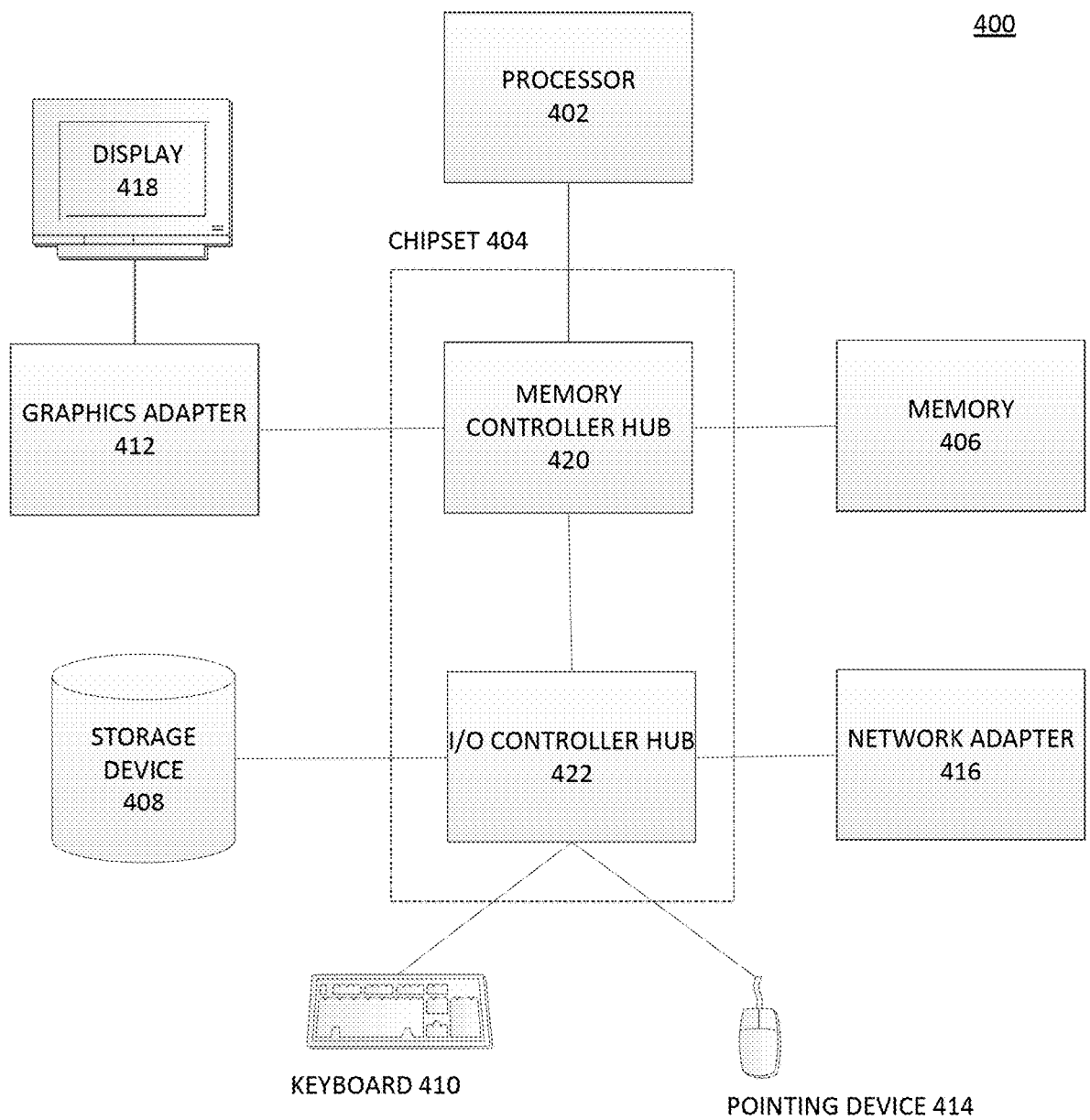
FIG. 4 illustrates example components of a computer used as part or all of the network system, the rider client device, and/or the driver client device, in accordance with an embodiment.

FIG. 4 is a block diagram illustrating physical components of a computer 400 used as part or all of the network system 130, rider client device 100, or driver client device 110 from FIG. 1, in accordance with an embodiment. Illustrated are at least one processor 402 coupled to a chipset

404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400, such as a host or smartphone, may lack a graphics adapter 412, and/or display 418, as well as a keyboard 410 or external pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

The foregoing description described one embodiment of the invention in which the network system 130 selects one or more recommended pickup locations based on pre-processed historical service data and real-time processed service data received from a rider. In other embodiments, the network system 130 pre-processes and stores the historical service data such that when a rider provides an origin location, the pickup location selection module 155 queries the pickup location data store 188, which returns the best pickup location for the trip. In still other embodiments, the network system 130 processes a trip request in real time such that when a rider submits a set of service data, the pickup location selection module 155 returns the result of the processing as the best pickup location.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for selecting a pickup location for a transportation service, the method comprising:

receiving, at a network system including one or more processors, from a computing device associated with a rider, a set of service data, the set of service data including an origin location and a request for a driver to transport the rider from the origin location;

identifying, using historical service data and location characteristics associated with the origin location, a plurality of candidate pickup locations within a threshold distance of a current location of the computing device;

sending at least two of the candidate pickup locations to the computing device;

receiving, from the computing device, a selection of a candidate pickup location from the at least two candidate pickup locations;

generating navigation instructions from the current location to the selected pickup location;

instructing the computing device to display a live video feed, the video feed being captured by a camera on the computing device; and instructing an augmented reality application on the computing device to visually augment the video feed with augmented reality elements based on the navigation instructions.

2. The method of claim 1, wherein the historical service data includes data regarding past trips beginning at the origin location.

3. The method of claim 1, wherein the location characteristics include one or more road or sidewalk conditions at the origin location.

4. The method of claim 1, further comprising ranking the candidate pickup locations based on past trips associated with the user and beginning at the origin location.

5. The method of claim 1, further comprising sending the selected pickup location to a driver computing device.

6. The method of claim 1, wherein the augmented reality elements include one or more of images, video, text, and graphics.

7. The method of claim 1, further comprising:
determining that the computing device is not on a route from the current location to the selected pickup location; and
instructing the augmented reality application to display augmented reality elements to navigate the rider to the route.

8. A non-transitory computer-readable storage medium storing computer-executable instructions that, in response to executing, cause a device comprising a processor to perform operations, comprising:
receiving, at a network system including one or more processors, from a computing device associated with a rider, a set of service data, the set of service data including an origin location and a request for a driver to transport the rider from the origin location;
identifying, using historical service data and location characteristics associated with the origin location, a plurality of candidate pickup locations within a threshold distance of a current location of the computing device, sending at least two of the candidate pickup locations to the computing device;
receiving, from the computing device, a selection of a candidate pickup location from the at least two candidate pickup locations, generating navigation instructions from the current location to the selected pickup location; instructing the computing device to display a live video feed, the video feed being captured by a camera on the computing device; and instructing an augmented reality application on the computing device to visually augment the video feed with augmented reality elements based on the navigation instructions.

9. The non-transitory computer-readable storage medium of claim 8, wherein the historical service data includes data regarding past trips beginning at the origin location.

10. The non-transitory computer-readable storage medium of claim 8, wherein the location characteristics include one or more road or sidewalk conditions at the origin location.

11. The non-transitory computer-readable storage medium of claim 8, further comprising ranking the candidate pickup locations based on past trips associated with the user and beginning at the origin location.

12. The non-transitory computer-readable storage medium of claim 8, further comprising sending the selected pickup location to a driver computing device.

13. The non-transitory computer-readable storage medium of claim 8, wherein the augmented reality elements include one or more of images, video, text, and graphics.

14. The non-transitory computer-readable storage medium of claim 8, further comprising:
determining that the computing device is not on a route from the current location to the selected pickup location; and
instructing the augmented reality application to display augmented reality elements to navigate the rider to the route.

15. A computer system comprising:
one or more computer processors for executing computer program instructions; and
a non-transitory computer-readable storage medium storing instructions executable by the one or more computer processors to perform steps comprising:
receiving at a network system including one or more processors, from a computing device associated with a rider, a set of service data, the set of service data including an origin location and a request for a driver to transport the rider from the origin location;
identifying, using historical service data and location characteristics associated with the origin location, a plurality of candidate pickup locations within a threshold distance of a current location of the computing device;
sending at least two of the candidate pickup locations to the computing device;
receiving, from the computing device, a selection of a candidate pickup location from the at least two candidate pickup locations;
generating navigation instructions from the current location to the selected pickup location;
instructing the computing device to display a live video feed, the video feed being captured by a camera on the computing device; and
instructing an augmented reality application on the computing device to visually augment the video feed with augmented reality elements based on the navigation instructions.

16. The method of claim 1, further comprising:
ranking the plurality of candidate pickup locations based on the historical service data and the location characteristics associated with the origin location; and
selecting at least two of the candidate pickup locations based on the ranking.

* * * * *